United States Patent [19]
Vander Veken

[11] 3,823,656
[45] July 16, 1974

[54] SINGLE-USE COFFEE FILTERS
[76] Inventor: Germaine Vander Veken, Vrijheidslaan 171, 1080 Brussels, Belgium
[22] Filed: Sept. 18, 1972
[21] Appl. No.: 289,933

[30] Foreign Application Priority Data
Apr. 26, 1972 Belgium.......................... 78264572

[52] U.S. Cl..................................... 99/295, 99/306
[51] Int. Cl......................... A47j 31/10, A47j 31/06
[58] Field of Search...... 99/295, 306, 304; 426/433, 426/434, 82, 72

[56] References Cited
UNITED STATES PATENTS
1,544,674  7/1925  Miller.................................. 99/306
1,763,863  6/1930  Richheimer........................... 99/306
3,139,344  6/1964  Weisman .............................. 99/295
3,389,650  6/1968  Michielsen........................... 99/295
3,695,168  10/1972  Brunt................................... 99/306

Primary Examiner—Robert W. Jenkins
Attorney, Agent, or Firm—Bacon & Thomas

[57] ABSTRACT

A single-use throw-away coffee filter comprising a water receiving filtering body having a bottom which is substantially constituted by a cartridge or capsule containing coffee and a filter element, the improvement comprising means to provide a sealing fit and to prevent relative movement between the filtering body and capsule, especially during the brewing of coffee.

13 Claims, 12 Drawing Figures

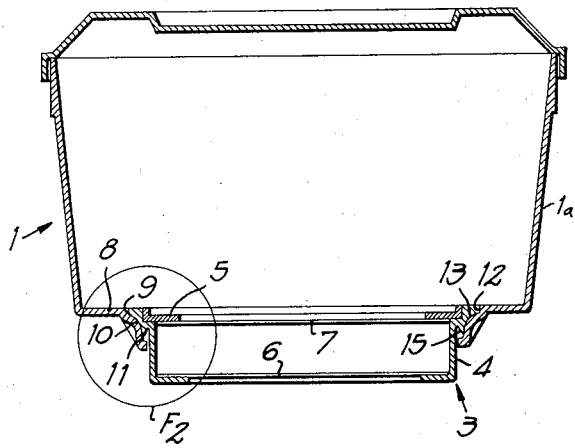
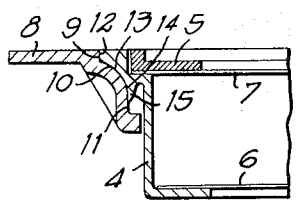
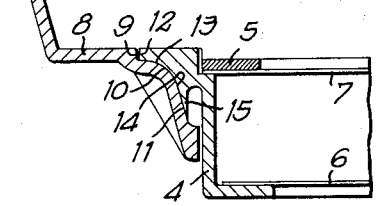
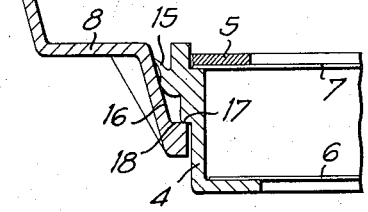
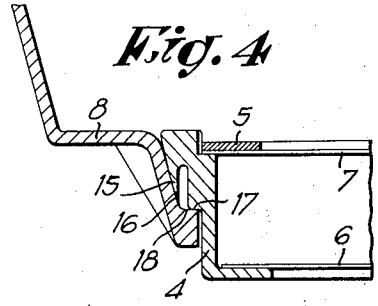
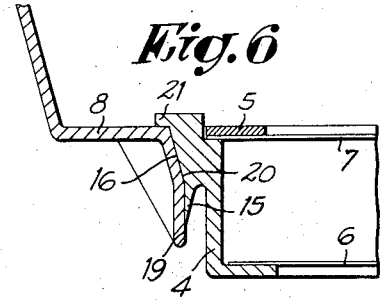

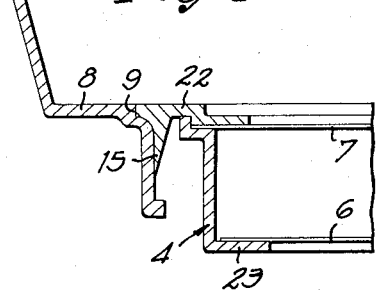
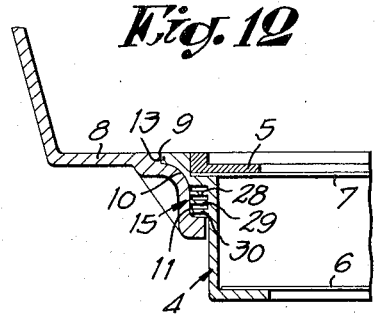
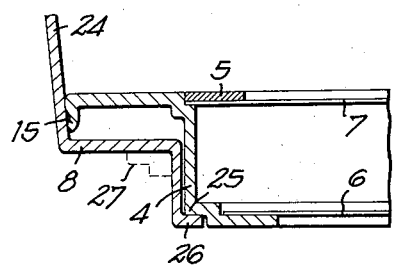
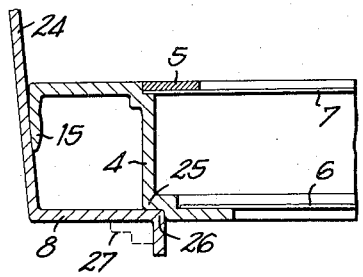
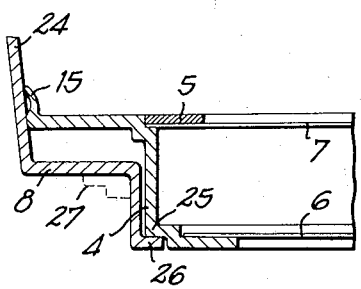
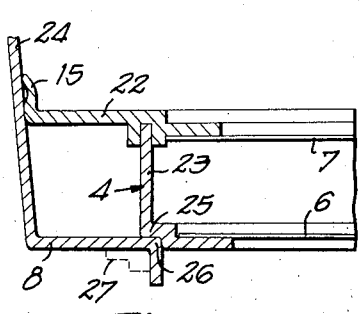

SINGLE-USE COFFEE FILTERS

This invention covers coffee filters for single use.

This invention covers more particularly single-use filters in which the filter consists of two main parts, viz. a capsule in which the ground coffee or similar is introduced and the filtering body proper wherewith the said capsule can cooperate during the preparation of the infusion.

Such capsules can be divided into two main groups, viz. a first group of which the capsules filled with ground coffee or similar are sold as such and a second group, of which the empty capsules are sold, both such as to allow the consumer himself to fill them with the required quantity, kind and quality of ground coffee or similar.

This invention covers both these groups of capsules as well as the actual filtering bodies which are liable to cooperate with such capsules.

Although the use of such capsules proves very sparing — the filtering body can be used several times — as compared with so-called filter packings which are entirely thrown away after use, the general use of the same has not so far made its way due to the difficulties experienced for merely introducing such capsules imperviously (liquid tight) into the filtering body and taking them out.

In fact it was found that when the capsule is introduced loose into the filtering body, it gets free very often from the filtering body and lets the water run off freely without percolating the ground coffee, this being due to the fact that on the one hand the capsule is made of light material and on the other hand the coffee or similar develops gases during the preparation of the infusion which exert a separating force between the capsule and the filtering body.

Endeavours have also been made with a view to improving the cooperation between capsule and filtering body by giving the capsules a conical or tapered outside wall which can cooperate with a conical opening or wall in the bottom of the filtering body.

Although the latter solution can be considered as adequate in respect of liquid imperviousness between capsule and filtering body, its main drawback is that the capsule can be pressed very tightly in the filtering body, which on the one hand can result in damage to the capsule and/or the filtering body, with all consequential detrimental effects, and on the other hand the capsule can be tightened so firmly in the filtering body that it is at least difficult to remove it after use and that its removal is often liable to cause damage to the filtering body, making reuse impossible.

The purpose of this invention is a filtering capsule and a filtering body which systematically eliminate the aforesaid drawbacks of the traditional capsules and affords a good connection between capsule and filtering body, thus entirely preventing the capsule from getting loose; moreover it warrants perfect imperviousness and after use the capsule can be removed from the filtering body without any difficulty, hindrance or damage.

The improvements covered by the invention and which afford the above-mentioned and other advantages mainly consist for this purpose of a filtering body proper in which, for the purpose of preparing the infusion, a capsule with an amount of ground coffee or similar can be introduced, with this special feature that connection between the filtering body and the capsule is obtained by profiling the filtering body on the one hand the outside wall of the capsule on the other hand with respect to each other so that on the one hand a somewhat tightening or locking effect is obtained between filtering body and capsule, therefor on the other hand the filtering body includes a shoulder to support the capsule and to prevent jamming of the capsule beyond a certain print in the filtering body.

With a view to setting forth the special features of the invention more clearly, we are describing below, without any restrictive character, a few preferential designs of a capsule and a filtering body according to the invention, with reference to the attached drawings, in which:

FIG. 1 reproduces a section of a filtering body with a filtering capsule according to the invention;

FIG. 2 reproduces on a larger scale the part indicated by F2 in FIG. 1;

FIGS. 3 to 12 are views similar to that of FIG. 2, but for design alternatives.

In FIG. 1 a filtering body 1 is reproduced with an upper lid 2 and lower capsule 3, this capsule consisting essentially of a bowl 4 with optionally removable lid 5, while the bottom of the bowl 4 and its lid 5 are provided with perforations, with a layer of filtering paper or similar, respectively 6 and 7. Filter body 1 furthermore comprises a water receiving vessel 1a.

As reproduced in this FIG. 1 and with more particulars in FIG. 2, the bottom 8 of the vessel 1a is provided with an opening wherewith the outer rim of the capsule 3 can cooperate, the said opening on the one hand and the said outside rim on the other hand being suitably profiled to enable them to cooperate efficiently, so as on the one hand to warrant perfect imperviousness between the two parts and on the other hand to simplify the insertion in and the removal from the filtering body of the capsule, so that no damage can be caused to either of them.

To this end the aforesaid opening in the bottom 8 of the vessel on filtering body shows in this design a peripheral sidewall having a first axial on vertical part or surface 9 (FIG. 2), which is lengthened at the lower part by a radially inwardly extending convex surface 10, which is lengthened itself at the lower surface by a second vertical part 11. The outside rim of the filtering capsule consists of a corresponding vertical or axial surface 12, a concave part 13 and a surface 14 which forms the outside wall of a lip or seal 15.

At least surfaces 9 and 10 of the opening of the vessel 1a are dimensioned closely with respect to interfitting contiguous surfaces 12 and 13 of capsule 3, and sealing lip 15 of the capsule will normally be dimensioned larger than its mating area on the surface 11 of body 1a.

This design enables the capsule to connect with three surfaces in the opening of the filtering body, and this connection is preferably made still more adequate by the sealing lip 15, with a somewhat larger diameter, which obtains a wedging effect in the opening of the filtering body and connects therein through deformation, while pushing the capsule further and tighter into the filtering body is prevented by means of the aforesaid convex and concave parts, respectively 10 and 12.

That is to say, insertion of the capsule 3 into the opening in the bottom of vessel 1a first causes sealing lip 15 to deform inwardly, as seen in FIG. 2, as it engages peripheral surface area 11 of the vessel lower opening sidewall. Further axial movement of the capsule 3 into the opening causes the surfaces 12 and 13 of capsule 3 to engage surfaces 9 and 10 of the sidewall opening in vessel 1a to support the capsule 3 and to positively prevent further axial movement of the capsule beyond a desired point when all the surfaces are in mutual contact as shown in FIG. 2. At this stage, the lip 15 is firmly wedged in the opening in the bottom of vessel 1a in a fluid tight relationship and the capsule 3 is firmly supported with respect to the filtering body 1 so as to prevent any relative movement between the body and the capsule during the brewing of coffee.

It is clear that the capsule 3 and/or the filtering body 1 will be made of a material showing a low but adequate elasticity, particularly where the lip 15 has a somewhat larger diameter than the corresponding local diameter in the filtering body 1.

FIG. 3 represents an alternative of FIG. 2, which merely differs from the design as per FIG. 2 in that the said surfaces or surface parts 11 and 14 are placed somewhat obliquely or tapered inwardly toward the center of the capsule 3 and vessel 1a.

FIG. 4 reproduces a design in which the lip 15 is formed on the outer periphery of capsule 3 and cooperates with an oblique or tapered surface 16 in the filtering body, while the capsule further includes an outwardly extending shoulder 17 which can cooperate with a bracket 18 in the filtering body.

FIG. 5 reproduces a design which is similar for that as per FIG. 2, while however the lip 15 is directed upwards and can cooperate with the inwardly tapered wall 16 of the filtering body.

In FIG. 6 the opening of the filtering body is formed by a tapered wall 16, which is lengthened at the lower part by a substantially vertical or non-tapered wall 19, while the tapered wall 20 of the capsule 3 cooperates with this wall 18 and the outside wall of the aforesaid lip 15 with the straight part 19. In this case the axially vertical downward directed motion of the capsule is positively limited by an inwardly extending shoulder 21 which cooperates with the upper rim of the bottom 8 of the filtering body.

FIG. 7 shows another alternative in which the design as per FIG. 2 is approximately applied and in which an additional bowl 4 in two parts is realized, viz. a first part 22 in a comparatively deformable material and a second part 23 in a similar or possibly more rigid material.

FIG. 8 shows a design in which the bowl 4 is realized so that the aforesaid lip 15 cooperates with the an unwardly tapered outside wall 24 of the filtering body 1, while the vertical downward motion of the capsule 4 in relation to the filtering body 1 is limited by an outwardly extending shoulder 25 which can rest on an inwardly extending annular shoulder part 26 provided for this purpose in the opening of the filtering body. An element 27 shown by a dotted line in this Figure can be used as an adjusting ring for setting up such a filtering body on coffee receiving cups of different diameters.

It is obvious that the latter design affords an independent imperviousness in respect of the tightening of the capsule on the filtering body with this difference that in such case, after having obtained the aforesaid pressure between the surfaces 25 and 26, the lip 15 is pushed somewhat more tightly against tapered wall 24 through the pressure of the water on the filtering capsule.

FIG. 9 reproduces a design which is almost similar to that of FIG. 8, while however the filtering capsule is positioned higher in the filtering body.

FIG. 10 shows a design which is also similar to that of FIG. 8, but in this case the lip 15 is directed upwards.

FIG. 11 reproduces another design with also an upwards directed edge which otherwise corresponds with the design as per FIG. 9.

Finally FIG. 12 reproduces an alternative in which the aforesaid lip 15 comprises a labyrinth seal formed by one or more circular edges, in this case, three, respectively 28–29–30, which preferably have a diameter somewhat larger than the corresponding inside diameter of the filtering body.

It is quite obvious that in this way a filtering plant is obtained which warrants a very adequate imperviousness between the filtering capsule and the filtering body, while at the same time through the strain between both these parts, the upward motion or the detaching motion of the filter capsule in the filtering body is avoided on the one hand and the fixing of the filtering capsule in the filtering body is entirely prevented through the fact that the motion of the same upon the introduction in the filtering body is limited on the other hand.

This invention is not at all limited to the design alternatives outlined as examples and represented on the attached drawings, but such a device can be carried out in any shape and dimensions without diverging from the frame of the invention.

What I claim is:

1. A single-use filter device comprising, in combination, a vessel adapted to contain a quantity of water and a capsule with a does of ground coffee or similar material, said capsule having upper and lower walls made of filtering material, said vessel having an inner wall with an inner ridge and another profiled portion and said capsule having an outer abutment adapted to cooperate with said inner ridge so as to be supported thereby and said capsule having moreover a lip adapted to cooperate with said other profiled portion so as to ensure a good sealing between the vessel and the capsule.

2. A single-use filter device as recited in claim 1, wherein said inner ridge extends radially inwardly and said outer abutment extends radially outwardly; and said lip cooperates with said other profiled portion in wedging relationship.

3. A single-use filter device according to claim 1, wherein said other profiled portion is inwardly tapered.

4. A single-use filter device according to claim 1, wherein said other profiled portion is vertical.

5. A single-use filter device according to claim 1, wherein said other profiled portion forms part of a peripheral edge delimiting a bottom opening in said vessel.

6. A single-use filter device according to claim 1, wherein said lip is directed downwardly.

7. A single-use filter device according to claim 1, wherein said lip is directed upwardly.

8. A single-use filter device according to claim 1, wherein said abutment is constituted by a concave part downwardly prolonged by said lip, whilst said inner ridge and said other profiled part have a shape which is complementary to that of said concave part and said lip.

9. A single-use filter device according to claim 1, wherein said abutment is constituted by a convex part downwardly prolonged by said lip, whilst said inner ridge and said other profiled part have a shape which is complementary to that of said convex part and said lip.

10. A single-use filter device according to claim 1, wherein said lip is connected to the body of said capsule by a circular rim.

11. A single-use filter device according to claim 1, wherein said lip is made of a plurality of parts.

12. A single-use filter device according to claim 1, wherein said lip is formed by a plurality of circular ribs.

13. In a single-use coffee filter unit including a water vessel having an opening in its bottom, including a sidewall of said opening, said opening receiving a coffee containing capsule in interfitting and sealing relationship with said sidewall, the improvement comprising:

1. said sidewall having a generally radially inwardly extending ridge forming a first portion of said sidewall;
2. said sidewall also having a generally axially extending second portion;
3. said capsule having a generally radially outwardly extending abutment on a peripheral area thereof;
4. said capsule also having a deformable seal element on another peripheral area of said capsule, the outer diametrical size of said seal element at rest being greater than the inner diametrical size of said axially extending sidewall portion, whereby said capsule is retained in said opening with the abutment thereof cooperating with the said ridge of said opening to positively prevent axial motion of said capsule beyond a desired point in said opening, and with said seal element engaging said axially extending sidewall portion in a liquid sealing and wedging relationship.

* * * * *